(12) United States Patent
Tanimoto

(10) Patent No.: US 7,317,483 B2
(45) Date of Patent: Jan. 8, 2008

(54) CHARGE TRANSFER DEVICE HAVING OUTPUT AMPLIFIER WITH REDUCED POWER CONSUMPTION

(75) Inventor: Takashi Tanimoto, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 919 days.

(21) Appl. No.: 10/371,777

(22) Filed: Feb. 21, 2003

(65) Prior Publication Data

US 2003/0169358 A1    Sep. 11, 2003

(30) Foreign Application Priority Data

Mar. 8, 2002 (JP) .............................. 2002-063610

(51) Int. Cl.
  *H04N 3/14* (2006.01)
  *H04N 5/335* (2006.01)
(52) U.S. Cl. .................. 348/300; 348/294; 348/301
(58) Field of Classification Search ................ 348/297, 348/298, 300–304, 311
See application file for complete search history.

(56) References Cited

U.S. PATENT DOCUMENTS

| 6,686,957 B1* | 2/2004 | Johnson et al. ........... 348/222.1 |
| 7,102,674 B2* | 9/2006 | Takahashi ................... 348/294 |
| 2002/0063790 A1* | 5/2002 | Takahashi ................... 348/311 |

FOREIGN PATENT DOCUMENTS

JP          09-154065          6/1997

\* cited by examiner

*Primary Examiner*—Tuan Ho
*Assistant Examiner*—Kelly Jerabek
(74) *Attorney, Agent, or Firm*—Fish & Richardson P.C.

(57) ABSTRACT

A charge transfer device for transferring information charge packet in accordance with a vertical synchronization signal and a horizontal synchronization signal. The charge transfer device includes a capacitor for storing information charge packet. An output amplifier is connected to the capacitor to be supplied with and operated by a first voltage. The output amplifier receives the potential at the capacitor and generates an image signal corresponding to the potential at the capacitor. The supply of the first voltage to the output amplifier is stopped during a blanking period of the vertical and horizontal synchronization signals.

8 Claims, 4 Drawing Sheets

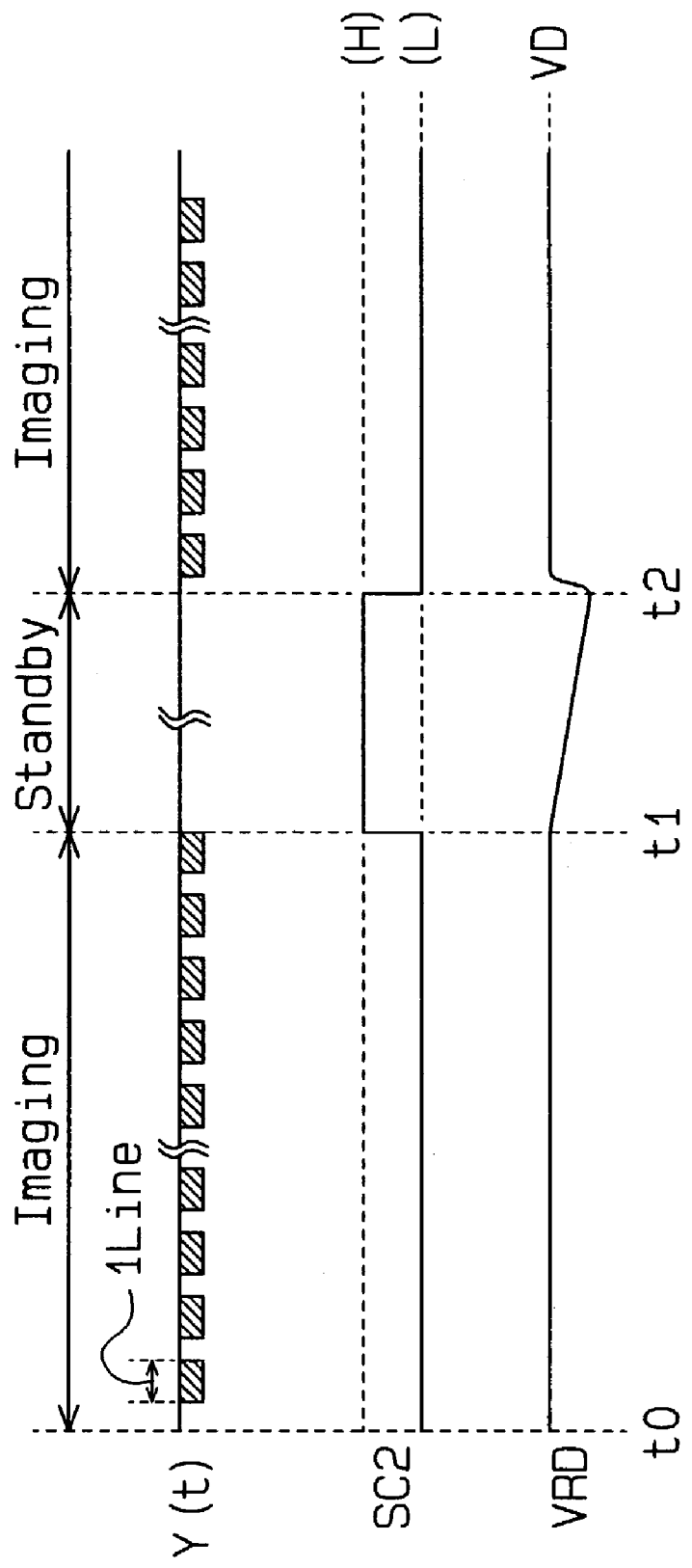

CHARGE TRANSFER DEVICE HAVING OUTPUT AMPLIFIER WITH REDUCED POWER CONSUMPTION

CROSS-REFERENCE TO RELATED APPLICATIONS

This application is based upon and claims the benefit of priority from the prior Japanese Patent Application No. 2002-063610, filed on Mar. 8, 2002, the entire contents of which are incorporated herein by reference.

BACKGROUND OF THE INVENTION

The present invention relates to a charge transfer device for transferring information charge packet in predetermined units and converting the information charge packet to a voltage value to generate an image signal.

FIG. 1 is a schematic block diagram of a prior art imaging device 50. The imaging device 50 includes a CCD image sensor 1, a boosting circuit 2, a regulating circuit 3, a vertical driver circuit 4, a horizontal driver circuit 5, and a timing control circuit 6.

The CCD image sensor 1, which is, for example, a frame transfer type device, includes an imaging section 1i, a storage section 1s, a horizontal transfer section 1h, and an output section 1d. The imaging section 1i includes a plurality of vertical shift registers. Each bit of the vertical shift registers configures a light receiving pixel. The storage section 1s includes a plurality of vertical shift registers, which are connected continuously with the vertical shift registers of the imaging section 1i. The horizontal transfer section 1h includes a single shift register extending horizontally toward the output side of the storage section 1s. Each bit of the horizontal transfer section 1h receives the output of each vertical shift register of the storage section 1s. The output section 1d is arranged at the output side of the horizontal transfer section 1h. The output section 1d includes a floating diffusion, which functions as a capacitor for receiving the outputs in packet unit (e.g., for single pixel) of the horizontal transfer section 1h, and a reset drain, for retrieving and draining the charges stored in the floating diffusion.

The boosting circuit 2 is, for example, a charge pump boosting circuit. The boosting circuit 2 receives power supply voltage VD from an external device and boosts the power supply voltage VD. The boosted voltage is supplied to the CCD image sensor 1 and the vertical driver circuit 4. The boosting circuit 2 includes a positive voltage charge pump and a negative voltage charge pump (not shown). The positive voltage charge pump generates positive boosted voltage VOH, and the negative voltage charge pump generates negative boosted voltage VOL. The positive boosted voltage VOH is supplied to the substrate side of the CCD image sensor 1 as a substrate voltage. Further, the positive boosted voltage VOH is resistor-divided and supplied to the reset drain of the output section 1d as a reset voltage VR. The negative boosted voltage VOL is supplied to the vertical driver circuit 4 as a voltage that generates a transfer clock, which is used to perform vertical transfer.

The regulating circuit 3 receives the power supply voltage VD, generates a predetermined adjusted voltage VK, and supplies the horizontal driver circuit 5 with the adjusted voltage VK. In the regulating circuit 3, the voltage value of the adjusted voltage VK is set in accordance with the operational voltage of the horizontal driver circuit 5 in the next stage. The power supply voltage VD is lowered to the operational voltage of the horizontal driver circuit 5 to generate the adjusted voltage VK.

The vertical driver circuit 4 is operated when supplied with the boosted voltage VOL from the boosting circuit 2. The vertical driver circuit 4 generates a frame transfer clock signal Øf and a vertical transfer clock signal Øv, provides the frame transfer clock signal Øf to the imaging section 1i, and provides the vertical transfer clock signal Øv to the storage section 1s. The frame transfer clock signal Øf and the vertical transfer clock signal Øv are generated in synchronism with a vertical synchronization signal VT and a horizontal synchronization signal HT, which are generated by the timing control circuit 6.

The horizontal driver circuit 5 is operated when supplied with the adjusted voltage VK from the regulating circuit 3. The horizontal driver circuit 5 generates a horizontal transfer clock signal Øh, an output clock signal Øo, and a reset clock signal Ør, provides the horizontal transfer clock signal Øh to the horizontal transfer section 1h, and provides the output clock signal Øo and the reset clock signal Ør to the output section 1d. The horizontal transfer clock signal Øh, the output clock signal Øo, and the reset clock signal Ør are generated in synchronism with the horizontal synchronization signal VT.

The timing control circuit 6 includes a plurality of counters for counting a reference clock signal CK, which has a constant cycle. The timing control circuit 6 divides the reference clock signal CK at a predetermined timing to generate the vertical synchronization signal VT and the horizontal synchronization signal HT. The timing control circuit 6 provides a timing signal to a signal processing circuit (not shown), the boosting circuit 2, and the regulating circuit 3. The signal processing circuit performs a predetermined signal process on the signal output from the CCD image sensor 1. That is, the timing control circuit 6 synchronizes the operation of each circuit with the operational timing of the CCD image sensor 1.

FIG. 2 is a timing chart illustrating the operation of the imaging device 50 shown in FIG. 1. The frame transfer clock signal Øf is generated during a blanking period of the vertical synchronization signal VT. Thus, the information charges stored in the imaging section 1i during a predetermined storage time are simultaneously transferred to the storage section is at a high speed.

The vertical transfer clock signal Øv is generated in synchronism with the frame transfer clock signal Øf and in synchronism with the horizontal synchronization signal HT. Thus, a single image page of information charges, which are transferred from the imaging section 1i in accordance with the frame transfer clock signal Øf, is retrieved in the storage section 1s and sequentially transferred to the horizontal transfer section 1h in single line units. The horizontal transfer clock Øh is generated in synchronism with the horizontal synchronization signal HT during the period in which a single line of information charges is transferred from the storage section 1s. Thus, information charges transferred from the storage section 1s are sequentially output to the output section 1d in charge packet units.

FIG. 3 is a timing chart illustrating the operation of the output section 1d. The output clock signal Øo goes high in synchronism with the horizontal transfer clock signal Øh. In this state, a single packet of charges, which are transferred from the horizontal transfer section 1h, are retrieved in the floating diffusion of the output section 1d. The potential at the floating diffusion changes in accordance with the amount of stored charges. An output amplifier generates an image signal Y(t) in accordance with the potential change.

The image signal Y(t), which is generated in accordance with the period in which charges are stored in the floating diffusion, has a signal level corresponding to the luminance level of a subject image generated in a light receiving area. The reset clock signal Ør goes high at a timing delayed by a predetermined timing from when the information charges are retrieved in the floating diffusion. This retrieves the information charges stored in the floating diffusion in the reset drain and drains the information charges from the reset drain. The image signal Y(t) has a reset level during the period corresponding to the reset operation. Only the signal level is retrieved from the image signal Y(t), which repeats the signal level and the reset level, in the analog signal processing circuit in the next stage. The image signal Y(t) having only the signal level is further provided to an A/D conversion circuit and a digital signal processing circuit in the next stage.

The imaging device 50 is incorporated in an electronic device (e.g., cellular phone or notebook type personal computer) to function as a digital camera. To reduce power consumption of the entire electronic device, the imaging device 50 is provided with a standby mode in which the supply of power to the imaging device 50 is stopped when the camera function is not in use. In the standby mode, the power supply voltage VD is supplied to the boosting circuit 2 and the regulating circuit 3. However, the operations of the boosting circuit 2 and the regulating circuit 3 are stopped to cut the supply of operation voltage to the vertical driver circuit 4, the horizontal driver circuit 5, and the timing control circuit 6 in the next stage.

It is required that the power consumption of the imaging device 50 be reduced when the camera function is in use to further reduce power consumption of the electronic device. In addition to the imaging device 50, which is incorporated in the electronic device, the reduction in power consumption is also important in digital cameras, which are battery-driven.

SUMMARY OF THE INVENTION

An aspect of the present invention is a charge transfer device for transferring information charge packet in accordance with a vertical synchronization signal and a horizontal synchronization signal. The charge transfer device includes a capacitor for storing information charge packet. An output amplifier is connected to the capacitor to be supplied with and operated by a first voltage. The output amplifier receives the potential at the capacitor and generates an image signal corresponding to the potential at the capacitor. The supply of the first voltage to the output amplifier is stopped during at least part of a blanking period of the vertical and horizontal synchronization signals.

A further aspect of the present invention is a charge transfer device for transferring information charge packet in accordance with a vertical synchronization signal and a horizontal synchronization signal. The charge transfer device includes a capacitor for storing information charge packet. An output amplifier is connected to the capacitor and operated by a first voltage. The output amplifier receives the potential at the capacitor and generates an image signal corresponding to the potential at the capacitor. A control circuit is connected to the output amplifier to stop the supply of the first voltage to the output amplifier during at least part of a blanking period of the vertical and horizontal synchronization signals.

A further aspect of the present invention is a method for controlling a charge transfer device that transfers information charge packet in accordance with a vertical synchronization signal and a horizontal synchronization signal. The charge transfer device includes a capacitor, which stores information charge packet, and an output amplifier, which is connected to the capacitor to generate an image signal in accordance with the potential at the capacitor. The method includes supplying the output amplifier with a first voltage, and stopping the supply of the first voltage to the output amplifier during at least part of a blanking period of the vertical and horizontal synchronization signals.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a timing chart illustrating the operation of a second switching transistor in the charge transfer device of FIG. 4.

DETAILED DESCRIPTION OF THE PREFERRED EMBODIMENTS

Figure 1:
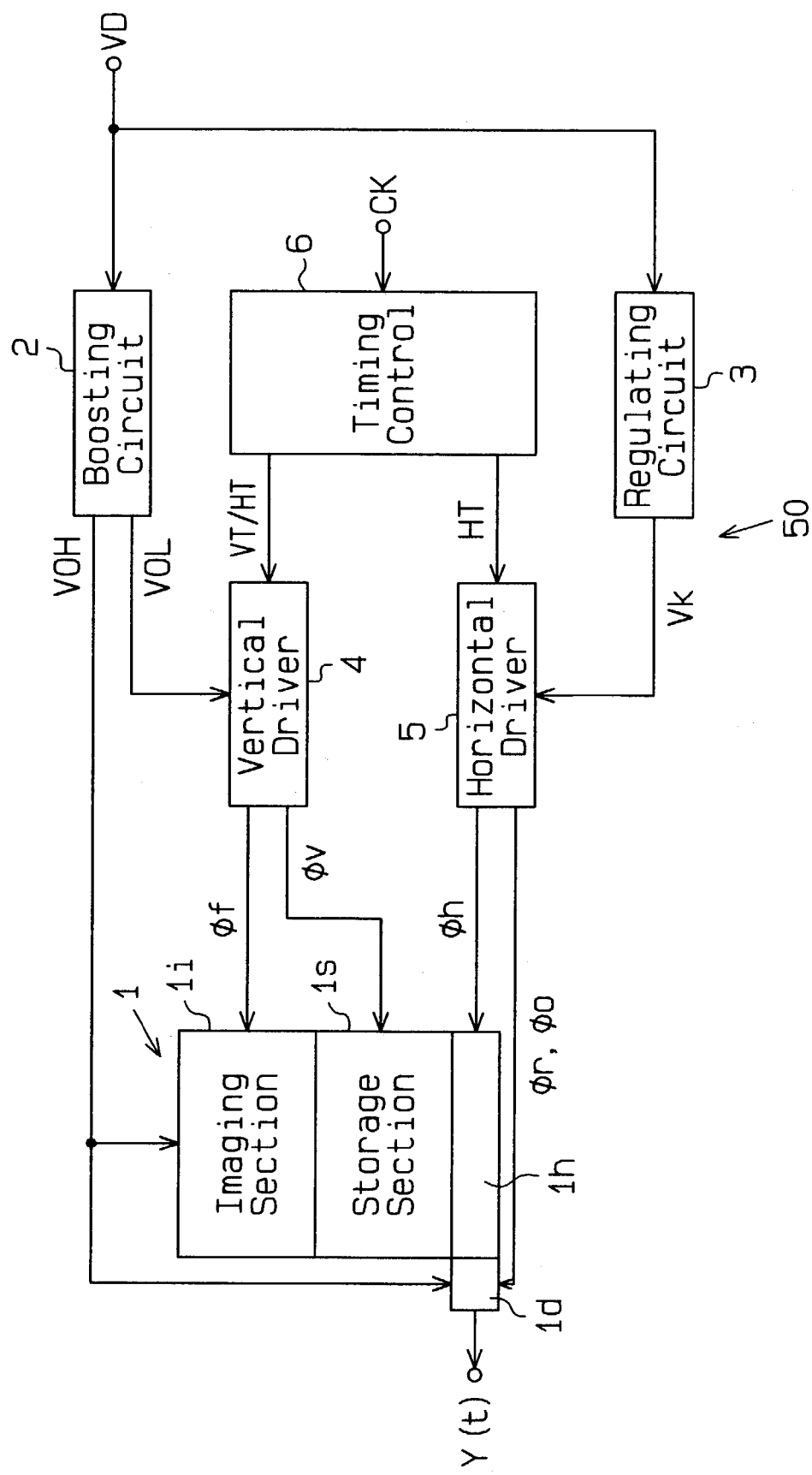
FIG. 1 is a schematic block diagram of a prior art imaging device.
Figure 2:
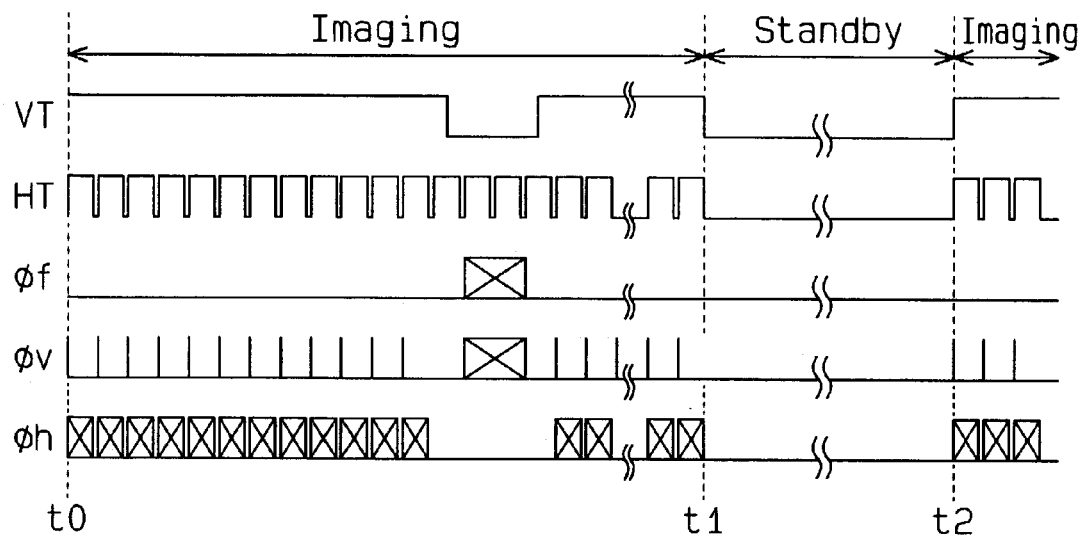
FIG. 2 is a timing chart illustrating the operation of FIG. 1.
Figure 3:
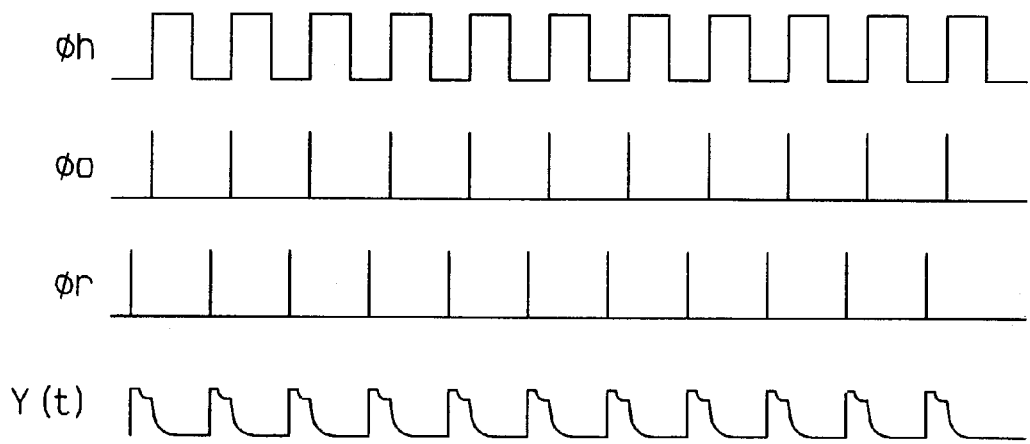
FIG. 3 is a timing chart illustrating the operation of an output section in the imaging device of FIG. 1.

In the drawings, like numerals are used for like elements throughout.

Figure 4:
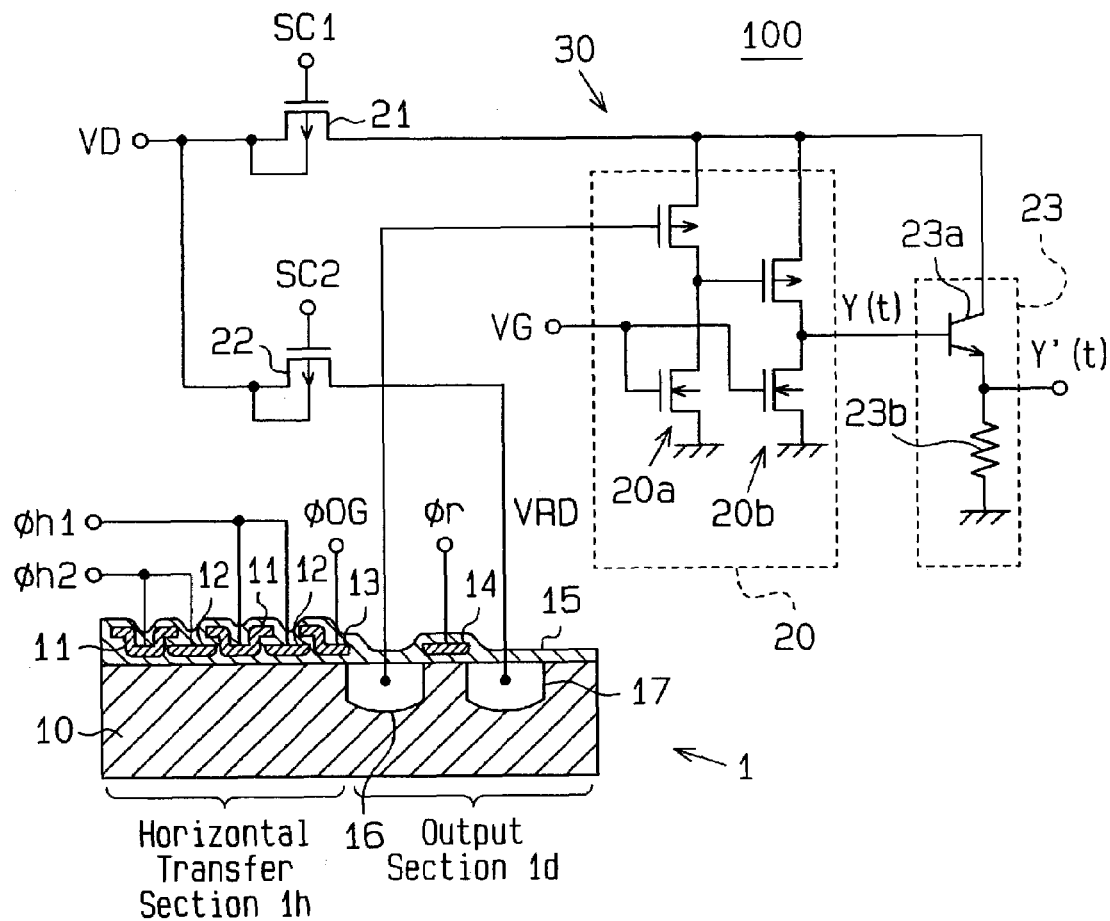
FIG. 4 is a cross-sectional view and circuit diagram illustrating a charge transfer device according to a preferred embodiment of the present invention.

FIG. 4 is a schematic cross-sectional view and circuit diagram of a charge transfer device 100 according to a preferred embodiment of the present invention. The charge transfer device 100, which includes a CCD image sensor 1 and an output circuit 30, is used as an imaging device incorporated in, for example, an electronic device. FIG. 4 is a schematic cross-sectional diagram illustrating a horizontal transfer section 1h and output section 1d of the CCD image sensor 1 and a circuit diagram of the output circuit 30. The imaging section 1i and storage section 1s (not shown) of the CCD image sensor 1 are identical to those shown in FIG. 1.

The horizontal transfer section 1h, which has the same configuration as that shown in FIG. 1, includes a plurality of multi-layered transfer electrodes 11 and 12, which are arranged on a silicon substrate 10 by means of an insulation film 15. The information charges are transferred to a channel area defined under the transfer electrodes 11 and 12 in accordance with horizontal transfer clock signals Øh1 and Øh2, which are respectively applied to the transfer electrodes 11 and 12. An output gate electrode 13 is configured at an output end of the horizontal transfer section 1h after the transfer electrodes 11 and 12.

A floating diffusion (capacitor) 16 is configured on the surface of the silicon substrate 10 adjacent to the output gate electrode 13 in the output side of the horizontal transfer section 1h. The floating diffusion (FD) 16 is connected to an input terminal of a first output amplifier 20 to temporarily store the information charges in packet unit (e.g., for single pixel) output from the horizontal transfer section 1h. The potential fluctuation at the FD 16 that corresponds to changes in the amount of information charges is transmitted to the first output amplifier 20.

A reset drain 17 is configured on the surface of the silicon substrate 10 at a position separated from the FD 16 by a predetermined distance. A predetermined voltage VRD (e.g., power supply voltage VD) is applied to the reset drain 17. The FD 16 and the reset drain 17 are configured by implanting a high concentration of n-type impure ions in the surface of the silicon substrate 10. A reset electrode 14 for receiving a reset clock signal Ør is configured between the FD 16 and the reset drain 17.

The FD 16, the reset drain 17, and the reset electrode 14 configure a reset transistor. The reset transistor connects the FD 16 and the reset drain 17 in response to the reset clock signal Ør to transfer the information charges (information charge packet) stored in the FD 16 to the reset drain 17.

An output circuit 30, which includes the first output amplifier 20, a second output amplifier 23, a first switching transistor (control circuit) 21, and a second switching transistor 22, is incorporated in the CCD image sensor 1 in the preferred embodiment.

The first output amplifier 20 includes, for example, two source follower circuits 20a and 20b. The input side of the first source follower circuit 20a receives potential fluctuation of the FD 16. The first output amplifier 20 is operated by the power voltage VD and impedance-converts the potential fluctuation of the FD 16 to generate an output signal Y(t). The source follower circuits 20a and 20b each have two MOS transistors connected in series between the input terminal of the power supply voltage VD and the ground. In each of the source follower circuits 20a and 20b, the gate of the power supply side MOS transistor functions as an input, the connecting node of the two MOS transistors functions as an output, and the gain is set in accordance with the control voltage VC supplied to the gate of the ground side MOS transistor. The first output amplifier 20 generates an output signal Y(t) having an increased drive force and an amplitude that is in accordance with the potential fluctuation of the FD 16.

The first switching transistor 21, which preferably is a p-channel MOS transistor, is connected between a power supply voltage VD and the first output amplifier 20. The substrate terminal of the transistor 21 is connected to the power supply voltage VD, and the gate of the transistor 21 receives a first control signal SC1. The second switching transistor 22, which preferably is a p-channel MOS transistor, is connected between the power supply voltage VD and the reset drain 17. The substrate terminal of the transistor 22 is connected to the power supply voltage VD, and the gate of the transistor 22 receives a second control signal SC2.

The second output amplifier 23 includes a bipolar transistor 23a and a resistor 23b. The bipolar transistor and the resistor configure an emitter follower circuit. The second output amplifier 23 is supplied with and operated by the power supply voltage VD. The base of the bipolar transistor 23a receives the output signal Y(t) of the first output amplifier 20. The second output amplifier 23 generates an output signal Y(t)' in accordance with the amplitude of the output signal Y(t). The second output amplifier 23 outputs the output signal Y(t)', the drive force of which is further increased.

Figure 5:
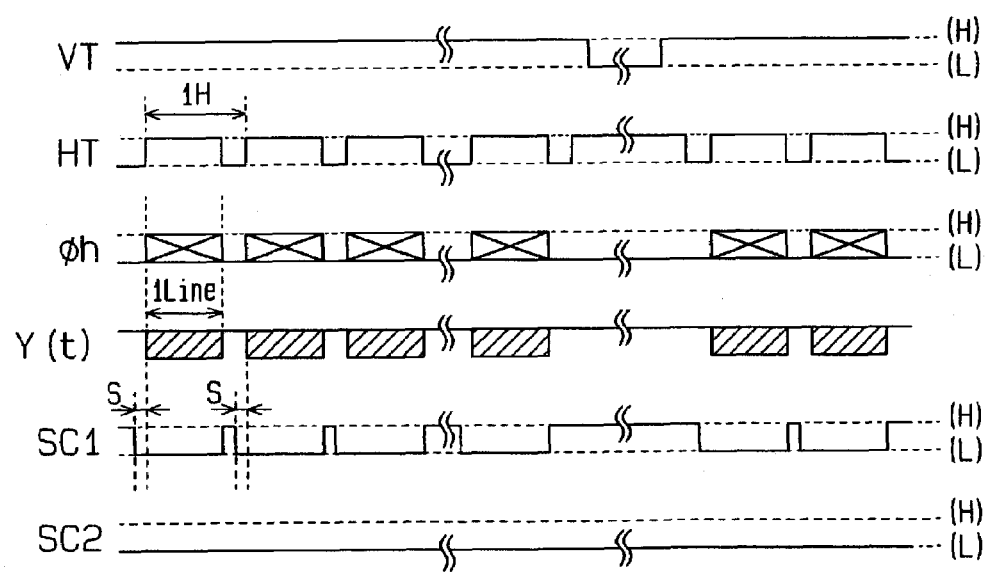
FIG. 5 is a timing chart illustrating the operation of the charge transfer device of FIG. 4.

The operation of the charge transfer device 100 of FIG. 4 will now be discussed. FIG. 5 is a timing chart illustrating the operation of the charge transfer device 100. In FIG. 5, (H) and (L) respectively represent a high level and a low level.

The vertical synchronization signal VT and the horizontal synchronization signal HT are generated by dividing a reference clock signal CK, which has a predetermined frequency, by a predetermined rate. For example, when complying with the NTSC standard, the horizontal synchronization signal HT is generated by dividing the reference clock CK, the frequency of which is four times the frequency 3.58 MHz of a color sub-carrier, by 1/910. Further, the vertical synchronization signal VT is generated by dividing the horizontal synchronization signal HT by 2/252. The vertical synchronization signal VT and the horizontal synchronization signal HT determine the vertical scanning and horizontal scanning of the CCD image sensor 1. The vertical synchronization signal VT determines the output period of the image signal Y(t) for a single image page, and a single cycle (1H) of the horizontal synchronization signal HT determines the output period of the image signal Y(t) for a single line.

The horizontal transfer clock signal Øh is generated synchronously with the horizontal synchronization signal HT when the horizontal synchronization signal HT is high. The horizontal transfer clock signal Øh sequentially transfers a single line of information charges in single packet units. The storage of charges to the FD 16 and the transfer of charges to the reset drain 17 are repeated alternately in accordance with the output clock signal Øo and the reset clock signal Ør. This outputs a single line of the image signal Y(t) during the period of 1 H.

The first control signal SC1 controls the operation of the first switching transistor 21 and is generated by, for example, a timing control circuit 6. The first control signal SC1 is generated in accordance with the vertical synchronization signal VT and the horizontal synchronization signal HT. More specifically, the first control signal SC1 goes low when the horizontal synchronization signal HT and the vertical synchronization signal VT go high. The first control signal SC1 goes high during a blanking period when the horizontal synchronization signal HT and the vertical synchronization signal VT go low. Thus, the first switching transistor 21 is switched off during the blanking period of the horizontal synchronization signal HT and the vertical synchronization signal VT. The timing in which the first control signal SC1 goes low has a margin S having a predetermined period with respect to the completion timing of the blanking period. Thus, the first switching transistor 21 is switched on before the output initiation timing of the image signal Y(t).

The second control signal SC2 controls the operation of the second switching transistor 22 and is generated by, for example, the timing control circuit 6. The second control signal SC2 is generated in accordance with the operation of the imaging device and the output amount of the information charges (number of information charge packets). The second control signal SC2 goes high when, for example, the imaging device is in the standby mode and the output of the image signal Y(t) for a single image page is completed. Accordingly, during the period shown in FIG. 5, the second control signal SC2 constantly has a low level, and the second switching transistor 22 is constantly activated.

The first and second output amplifiers 20 and 23 are intermittently supplied with power by operating the first switching transistor 21 in accordance with the vertical synchronization signal VT and the horizontal synchronization signal HT. That is, the first switching transistor 21 is activated only when the image signal Y(t) is output to efficiently supply the first and second output amplifiers 20 and 23 with power. This avoids unnecessary current consumption in the first and second output amplifiers 20 and 23 and reduces the power consumption of the imaging device.

FIG. 6 is a timing chart illustrating the operation of the second switching transistor 22. When the imaging device is operated during timing t0 to timing t1, the image signal Y(t) is sequentially output in units of single lines. The second control signal SC2 is constantly low. Thus, the second switching transistor 22 is switched on. This applies a reset voltage VRD having a predetermined voltage (VD) to the reset drain 17.

During timing t1 to t2 when the imaging device is set in the standby mode, the generation of the clock pulses provided to the CCD image sensor 1 is stopped. This stops the generation of the image signal Y(t). In this state, if the output of a single image signal Y(t) is completed, the second control signal SC2 goes high and switches off the second switching transistor 22. This stops supplying the reset drain 17 with the reset voltage VRD and gradually decreases the voltage at the reset drain 17.

The second switching transistor 22 is switched off only when the output of a single image screen Y(t) is completed. This prevents residual charges from mixing with the information charges when the residual charges in the reset drain 17 enter the horizontal transfer section 1h and the storage section 1s. Accordingly, the second switching transistor 22 is not switched off when the information charges are being stored in the imaging section 1i and the storage section 1s during the standby mode.

Subsequent to timing t2, in which the imaging device enters the operating state again, the output of the image signal Y(t) is started and the second control signal SC2 goes low. Thus, the second switching transistor 22 is switched on again. This starts supplying the reset drain 17 with the reset voltage VRD.

The charge transfer device 100 of the preferred embodiment has the advantages described below.

(1) The supply of power to the first and second output amplifiers 20, 23 is stopped during at least part of the scanning time of the vertical scanning and horizontal scanning period. This stops power consumption during a period that is irrelevant to the output period of the imaging device. As a result, the power consumption of the imaging device is reduced. This, in turn, reduces the power consumption of the entire electronic device.

(2) Prior to the timing for starting the output of the image signal Y(t), the first switching transistor 21 is switched on to supply the first and second output amplifiers 20, 23 with operational voltage that is increased to a sufficient level.

(3) The second switching transistor 22 is temporarily switched off when the imaging device is in the standby mode and the output of the image signal Y(t) for a single image screen is completed. That is, the reset drain 17 is intermittently supplied with the reset voltage VRD. Thus, the reset drain 17 is efficiently supplied with voltage. This further decreases the power consumption of the imaging device.

It should be apparent to those skilled in the art that the present invention may be embodied in many other specific forms without departing from the spirit or scope of the invention. Particularly, it should be understood that the present invention may be embodied in the following forms.

The application of the present invention is not related to the frame transfer type CCD image sensor 1 and may also be applied to an image sensor employing different transfer techniques, such as an interline image sensor or a frame interline image sensor. That is, the present invention may be applied to an image sensor that converts the information charges, which are transferred from the horizontal transfer section 1h to a voltage value with the output section.

The first and second switching transistors 21 and 22 may be arranged in an external circuit of the CCD image sensor 1, such as a vertical driver circuit 4.

The reset voltage VR does not necessarily have to directly use the power supply voltage VD and may use a voltage that is generated based on a boosted voltage produced by boosting the power supply voltage VD.

The present examples and embodiments are to be considered as illustrative and not restrictive, and the invention is not to be limited to the details given herein, but may be modified within the scope and equivalence of the appended claims.

What is claimed is:

1. A charge transfer device for transferring information charge packet in accordance with a vertical synchronization signal and a horizontal synchronization signal, the charge transfer device comprising:
    a capacitor for storing the information charge packet;
    an output amplifier connected to the capacitor to be supplied with, and operated by, a first voltage, wherein the output amplifier receives a potential at the capacitor and generates an image signal corresponding to the potential at the capacitor, supply of the first voltage to the output amplifier being stopped during at least part of a blanking period of the vertical and horizontal synchronization signals;
    a first switching transistor connected to the output amplifier to selectively supply the output amplifier with the first voltage in response to at least one of the vertical synchronization signal and the horizontal synchronization signal;
    a reset drain arranged adjacent to the capacitor to drain the information charge packet stored in the capacitor synchronously with a transfer operation of the information charge packet; and
    a second switching transistor connected to the reset drain to supply the reset drain with a second voltage, wherein the second switching transistor stops supplying the reset drain with the second voltage after completing output of a predetermined amount of the image signal from the output amplifier.

2. The charge transfer device according to claim 1, wherein supply of the first voltage is started prior to completion of at least one blanking period of the vertical and horizontal synchronization signals.

3. The charge transfer device according to claim 1, wherein the predetermined amount of the image signal is an image signal for a single image screen.

4. A charge transfer device for transferring an information charge packet in accordance with a vertical synchronization signal and a horizontal synchronization signal, the charge transfer device comprising:
    a capacitor for storing the information charge packet; and
    an output amplifier connected to the capacitor operated by a first voltage, wherein the output amplifier receives a potential at the capacitor and generates an image signal corresponding to the potential at the capacitor;
    a control circuit connected to the output amplifier to stop supply of the first voltage to the output amplifier during at least part of a blanking period of the vertical and horizontal synchronization signals, wherein the control circuit includes a first switching transistor connected to the output amplifier to selectively supply the output amplifier with the first voltage in response to at least one of the vertical synchronization signal and the horizontal synchronization signal;

a reset drain arranged adjacent to the capacitor to drain the information charge packet stored in the capacitor synchronously with a transistor of the information charge packet; and a second switching transistor connected to the reset drain to supply the reset drain with a second voltage, wherein the second switching, transistor stops supplying the reset drain with the second voltage after completing output of a predetermined amount of the image signal from the output amplifier.

5. A method for controlling a charge transfer device that transfers an information charge packet in accordance with a vertical synchronization signal and a horizontal synchronization signal, the charge transfer device including a capacitor that stores the information charge packet, an output amplifier that is connected to the capacitor to generate an image signal in accordance with a potential at the capacitor, and a reset drain arranged adjacent to the capacitor to drain the information charge packet stored in the capacitor synchronously with a transfer operation of the information charge packet, the method comprising the steps of:

supplying the output amplifier with a first voltage;

stopping supply of the first voltage to the output amplifier during at least part of a blanking period of the vertical and horizontal synchronization signal;

generating a second voltage;

supplying the reset drain with the second voltage; and stopping supply of the second voltage to the reset drain after outputting a predetermined amount of the image signal from the output amplifier.

6. The method according to claim 5, further comprising the step of:

starting supply of the first voltage to the output amplifier before completion of at least one blanking period of the vertical and horizontal synchronization signals.

7. The method according to claim 5, wherein the step for stopping supply of the second voltage includes stopping supply of the second voltage to the reset drain after outputting the image signal for a single image screen from the output amplifier.

8. The method according t claim 5, wherein the step for stopping supply of the second voltage includes stopping supply of the second voltage to the reset drain during the blanking period of the vertical synchronization signal.

* * * * *